(12) United States Patent
Jamadagni et al.

(10) Patent No.: US 12,495,329 B2
(45) Date of Patent: Dec. 9, 2025

(54) SYSTEM AND METHOD FOR OFFLOADING SELECTED NUMBER OF USERS

(71) Applicant: JIO PLATFORMS LIMITED, Ahmedabad (IN)

(72) Inventors: Satish Nanjunda Swamy Jamadagni, Bangalore (IN); Pradeep Krishnamurthy Hirisave, Bangalore South (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/579,277

(22) PCT Filed: May 24, 2023

(86) PCT No.: PCT/IB2023/055333
§ 371 (c)(1),
(2) Date: Jan. 12, 2024

(87) PCT Pub. No.: WO2023/228102
PCT Pub. Date: Nov. 30, 2023

(65) Prior Publication Data
US 2024/0334247 A1 Oct. 3, 2024

(30) Foreign Application Priority Data
May 24, 2022 (IN) .............................. 202221029678

(51) Int. Cl.
*H04L 65/611* (2022.01)
*H04W 28/08* (2023.01)

(52) U.S. Cl.
CPC ....... *H04W 28/0846* (2020.05); *H04L 65/611* (2022.05)

(58) Field of Classification Search
CPC .................. H04L 65/611; H04W 28/0846
USPC ........................................... 709/234
See application file for complete search history.

(56) References Cited

U.S. PATENT DOCUMENTS

| | | | |
|---|---|---|---|
| 10,791,157 B2 * | 9/2020 | Kazerani | H04L 65/80 |
| 2015/0071293 A1 | 3/2015 | Rajapakse | |
| 2015/0081847 A1 * | 3/2015 | Hao | H04L 65/762 |
| | | | 709/219 |

(Continued)

FOREIGN PATENT DOCUMENTS

WO WO-2021186474 A1 * 9/2021 ............ H04W 24/08

OTHER PUBLICATIONS

International Search Report from International Appl. No. PCTIB2023055333, mailed Nov. 30, 2023.

*Primary Examiner* — Glenford J Madamba
(74) *Attorney, Agent, or Firm* — FINNEGAN, HENDERSON, FARABOW, GARRETT & DUNNER LLP

(57) ABSTRACT

The present disclosure provides a system and a method for offloading users from a unicast platform to a broadcast platform. The system receives a request from various users and identifies users accessing similar media content. The system further receives a direction of mobility and a radio capability from the users and determines a point of viewing with a corresponding buffer time. The system determines a sliding window for offloading the one or more users and intelligently offloads the users from a unicast network to a broadcast network across various radio access technologies (RATs).

13 Claims, 11 Drawing Sheets

(56) References Cited

U.S. PATENT DOCUMENTS

2016/0191258 A1\* 6/2016 Oyman .................. H04L 65/60
                                                   370/312
2022/0095155 A1\* 3/2022 Naik ....................... H04L 65/80
2022/0330095 A1\* 10/2022 Kim .................. H04N 21/6125

\* cited by examiner

SYSTEM AND METHOD FOR OFFLOADING SELECTED NUMBER OF USERS

RESERVATION OF RIGHTS

A portion of the disclosure of this patent document contains material, which is subject to intellectual property rights such as but are not limited to, copyright, design, trademark, integrated circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to systems and methods for transmission technologies in a telecommunication system. More particularly, the present disclosure relates to a system and a method for offloading users from a unicast platform to a broadcast platform.

BACKGROUND OF INVENTION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

Broadcast/Multicast Service commonly known as BMS is a method for sharing a media content across a set of users using a common set of resources. There are many solutions that exists across many standards like a third generation partnership project (3GPP), third generation partnership project 2 (3GPP2), advanced televisions systems committee (ATSC), digital video broadcasting-handheld (DVB-H) across a set of users using a common set of resources. When operators deploy one or more such broadcast systems along with traditional unicast wireless systems, there is a need to occasionally switch between unicast and broadcast systems, especially when more users in each area are watching the same content.

When switching a unicast user to a broadcast platform, even when the content is common, the point of viewing will have to be synchronized. It is understood that in a fifth generation (5G) network and beyond, throughputs experienced by the user devices will be in the order of hundreds of Megabits per second (MBPS). This high throughput leads to higher amount of data being buffered at device side. Hence, an efficient system capable of handling higher amounts of data and synchronizing may be required. Currently, systems lack mechanisms which can seamlessly and intelligently offload certain users to a cellular or non-cellular broadcast/multicast network or onload them back to a unicast network as well without a disruption of service.

There is, therefore, a need in the art to provide a system and a method that can mitigate the problems associated with the prior arts.

OBJECTS OF THE INVENTION

Some of the objects of the present disclosure, which at least one embodiment herein satisfies are listed herein below.

It is an object of the present disclosure to provide a system and a method that intelligently offloads certain users from a unicast network to a broadcast network without a disruption of service.

It is an object of the present disclosure to provide a system and a method that identifies a user viewing point of content and using parameters such as buffer status decides on a switching decision from the unicast network to the broadcast network.

It is an object of the present disclosure to provide a system and a method that addresses an issue of user switching between the unicast to broadcast/multicast either in the same radio access technology (RAT) or in a different broadcast RAT.

It is an object of the present disclosure to provide a system and a method that intelligently and seamlessly offloads certain users from one broadcast/multicast system to another and thereby enables an efficient usage of licensed radio resources.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for offloading consumers across one or more radio access technologies. The system includes a processor, and a memory operatively coupled to the processor, where the memory stores instructions to be executed by the processor. The processor receives a user request from one or more users. The user request is based on a content under viewership by the one or more users via a computing device. The system includes an offload entity associated with the processor and the memory which causes the offload entity to determine an opportunity to offload the one or more users by being configured to identify the one or more users accessing a similar media content based on the content under viewership, receive one or more parameters from the one or more users based on the similar media content, determine a viewing time stamp and a buffer time for each of the one or more users, determine a sliding window based on a user tolerance for a disruption in a viewing point for offloading the one or more users based on the one or more parameters, the viewing time stamp, and the buffer time, and intelligently offload at least a user among the one or more users from a unicast network system to a broadcast or a multicast network system based on the sliding window.

In an embodiment, the processor may periodically receive the viewing time stamp from the computing device and generate a buffer status report based on the buffer time and the viewing time stamp.

In an embodiment, the unicast network system may include a cellular network system, and the broadcast or the multicast network system may include a non-cellular network system.

In an embodiment, the processor may determine the viewing timestamp based on the identification of the one or more users accessing the similar media content at the same viewing time stamp or different viewing time stamp.

In an embodiment, the processor may determine the buffer time based on a latest downloaded segment by the one or more users.

In an embodiment, the processor may determine the viewing time stamp based on a configuration message received from the computing device within a predetermined period.

In an embodiment, the one or more parameters may include at least one of a direction of mobility and a radio capability of the one or more users.

In an embodiment, the processor may insert one or more advertisements for a preset time to synchronize the one or more users.

In an embodiment, the processor may intelligently onload at least another user among the one or more users from the broadcast or the multicast network system to the unicast network system based on the sliding window.

In an aspect, the present disclosure relates to a method for offloading consumers across one or more radio access technologies. The method includes receiving, by a processor associated with a system, a user request from one or more users. The user request is based on a content under viewership by the one or more users via a computing device. The method includes determining, by an offload entity included in the system and associated with the processor, an opportunity to offload the one or more users. The method includes identifying, by the processor, the one or more users accessing a similar media content based on the content under viewership. The method includes receiving, by the processor, one or more parameters from the one or more users based on the similar media content. The method includes determining, by the processor, a viewing time stamp and a buffer time for each of the one or more users. The method includes determining, by the processor, a sliding window based on a user tolerance for a disruption in a viewing point for offloading the one or more users based on the one or more parameters, the viewing time stamp, and the buffer time. The method includes intelligently offloading, by the processor, at least a user among the one or more users from a unicast network system to a broadcast or a multicast network system based on the sliding window.

In an embodiment, the method may include periodically receiving, by the processor, the viewing time stamp from the computing device and generating, by the processor, a buffer status report based on the buffer time and the viewing time stamp.

In an embodiment, the method may include determining, by the processor, the viewing time stamp based on the identification of the one or more users accessing the similar media content at the same viewing time stamp or different viewing time stamp.

In an embodiment, the method may include determining, by the processor, the buffer time based on a latest downloaded segment by the one or more users.

In an embodiment, the method may include inserting, by the processor, one or more advertisements for a preset time to synchronize the one or more users.

In an embodiment, the method may include intelligently onloading, by the processor, at least another user among the one or more users from the broadcast or the multicast network system to the unicast network system based on the sliding window.

In an aspect, a user equipment (UE) for sending requests includes one or more processors communicatively coupled to a processor in a system. The one or more processors are coupled with a memory and said memory stores instructions to be executed by the one or more processors. The one or more processors transmit a request to the processor via a network. The request is based on a content under viewership by one or more users via the UE. The processor is associated with an offload entity included in the system to determine an opportunity to offload the one or more users by being configured to receive the request from the UE, identify the one or more users accessing a similar media content based on the content under viewership, receive one or more parameters from the one or more users based on the similar media content, determine a viewing time stamp and a buffer time for each of the one or more users, determine a sliding window based on a user tolerance for a disruption in a viewing point for offloading the one or more users based on the one or more parameters, the viewing time stamp, and the buffer time, and intelligently offload at least a user among the one or more users from a unicast network system to a broadcast or a multicast network system based on the sliding window.

In an aspect, a non-transitory computer readable medium includes a processor with executable instructions that causes the processor to receive a user request from one or more users. The user request is based on a content under viewership by the one or more users via a computing device. The processor determines an opportunity to offload the one or more users via an offload entity. The processor identifies the one or more users accessing a similar media content based on the content under viewership. The processor receives one or more parameters from the one or more users based on the similar media content. The processor determines a viewing time stamp and a buffer time for each of the one or more users. The processor determines a sliding window based on a user tolerance for a disruption in a viewing point for offloading the one or more users based on the one or more parameters, the viewing time stamp, and the buffer time. The processor intelligently offloads at least a user among the one or more users from a unicast network system to a broadcast or a multicast network system based on the sliding window.

BRIEF DESCRIPTION OF DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components, or circuitry commonly used to implement such components.

Figure 6:
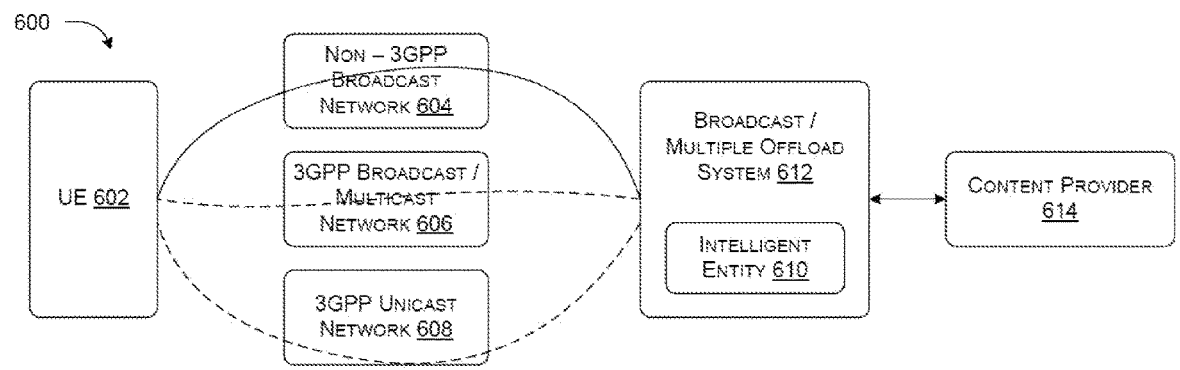

FIG. 6 illustrates an exemplary offload/onload management (600) with a service continuity module, in accordance with an embodiment of the present disclosure.

Figure 7:
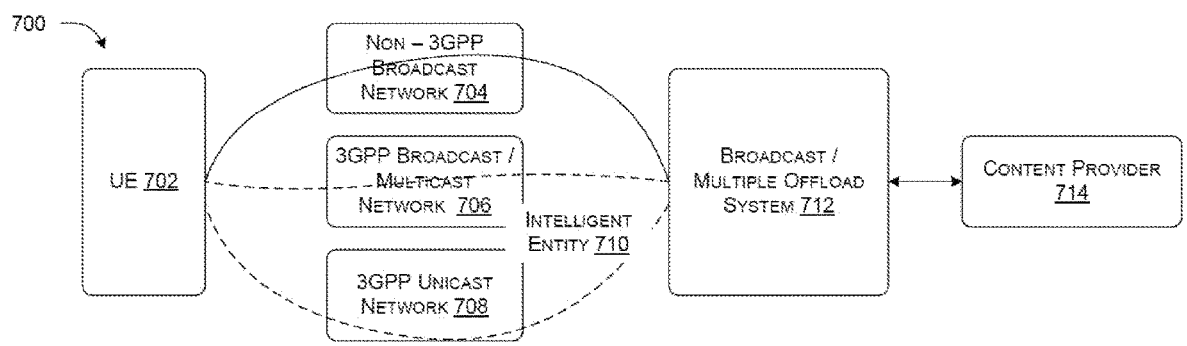

FIG. 7 illustrates an exemplary offload management (700) with an intelligent entity, in accordance with an embodiment of the present disclosure.

Figure 8:
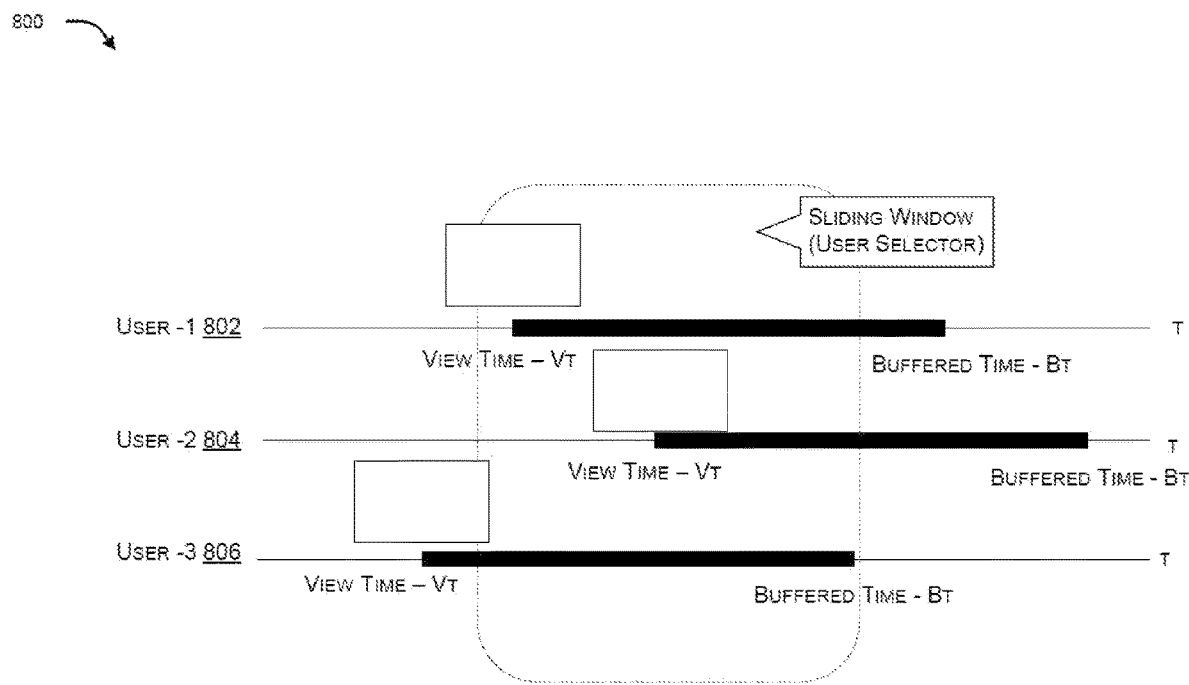

FIG. 8 illustrates an exemplary diagram (800) representing a sliding window, in accordance with an embodiment of the present disclosure.

Figure 9:
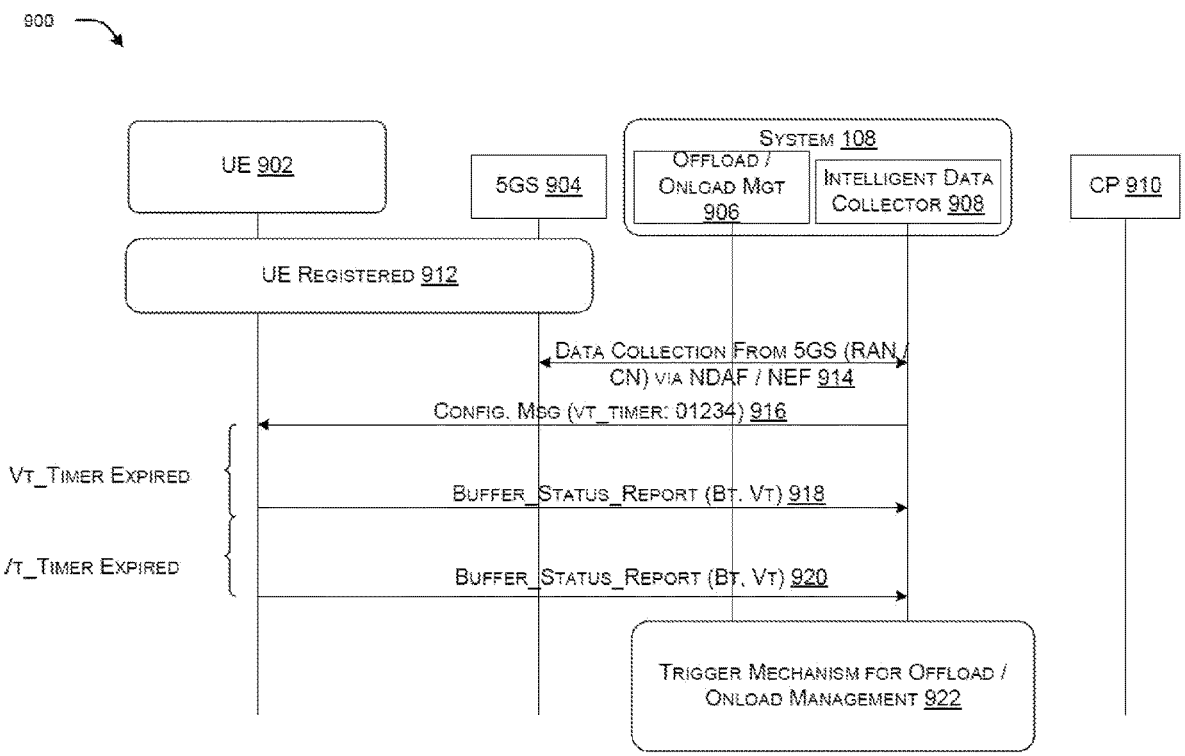

FIG. 9 illustrates an exemplary flow diagram (900) for generating a buffer status report (BSR) with a periodic configuration, in accordance with an embodiment of the present disclosure.

Figure 10:
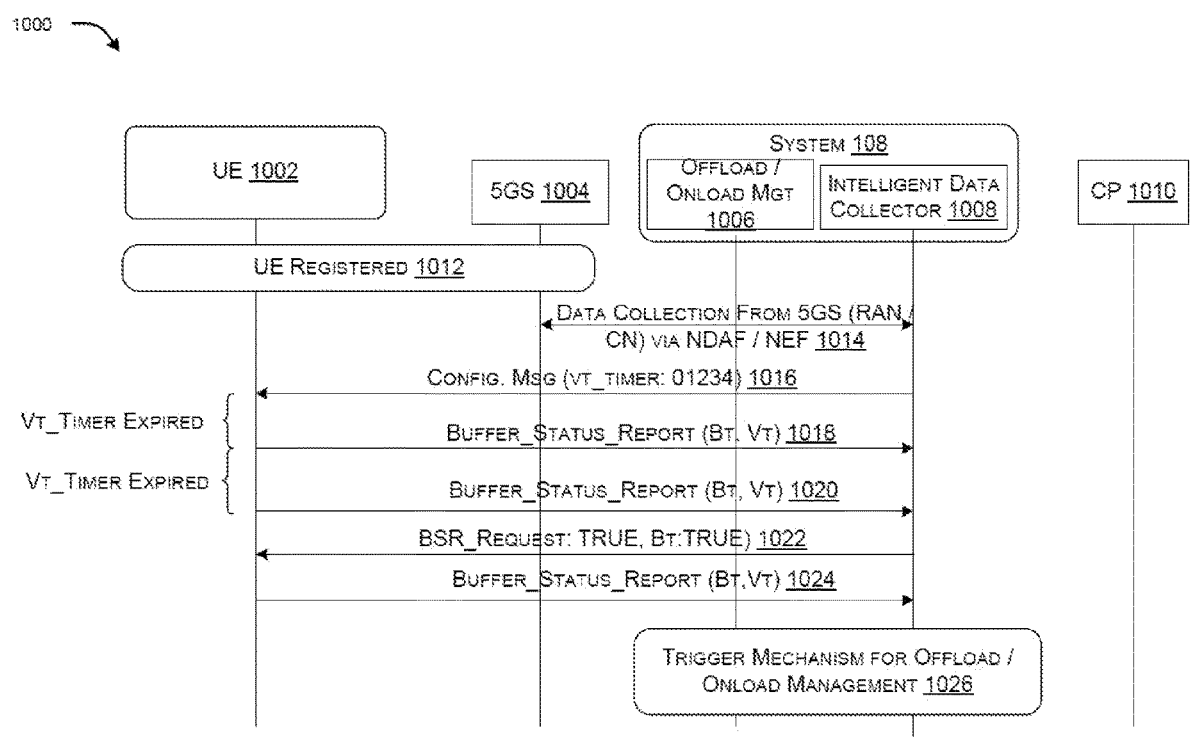

FIG. 10 illustrates an exemplary flow diagram (1000) for generating a BSR with an on-demand basis configuration, in accordance with an embodiment of the present disclosure.

Figure 11:
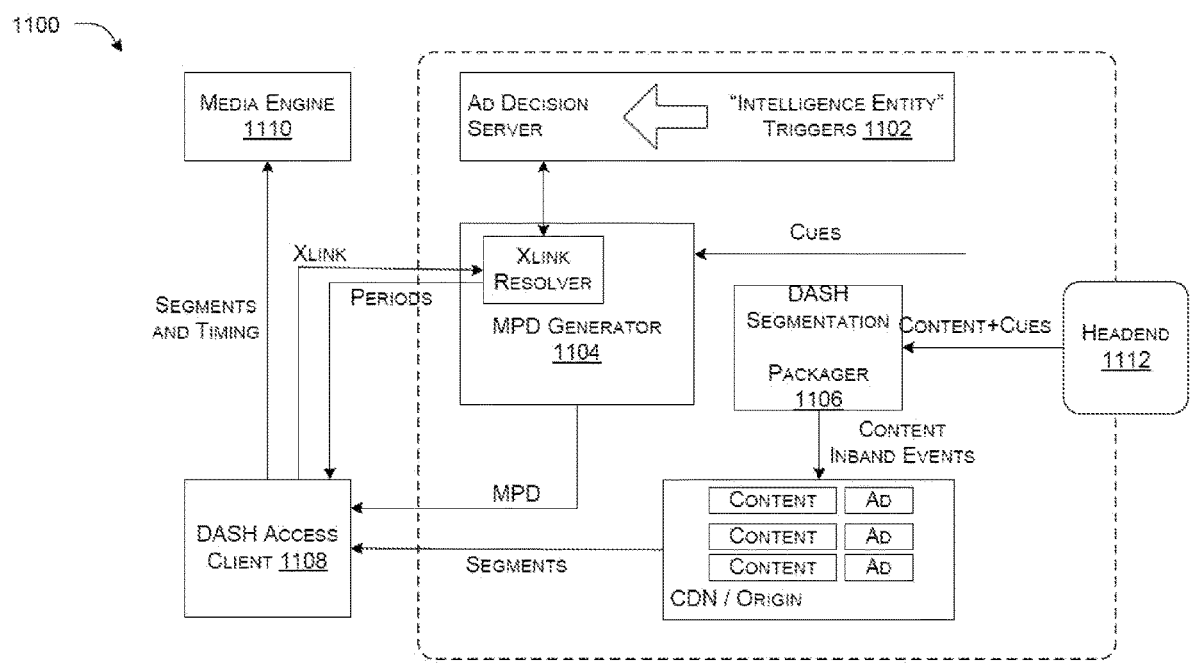

FIG. 11 illustrates an exemplary advertisement insertion mechanism (1100) in the system (108), in accordance with an embodiment of the present disclosure.

Figure 12:
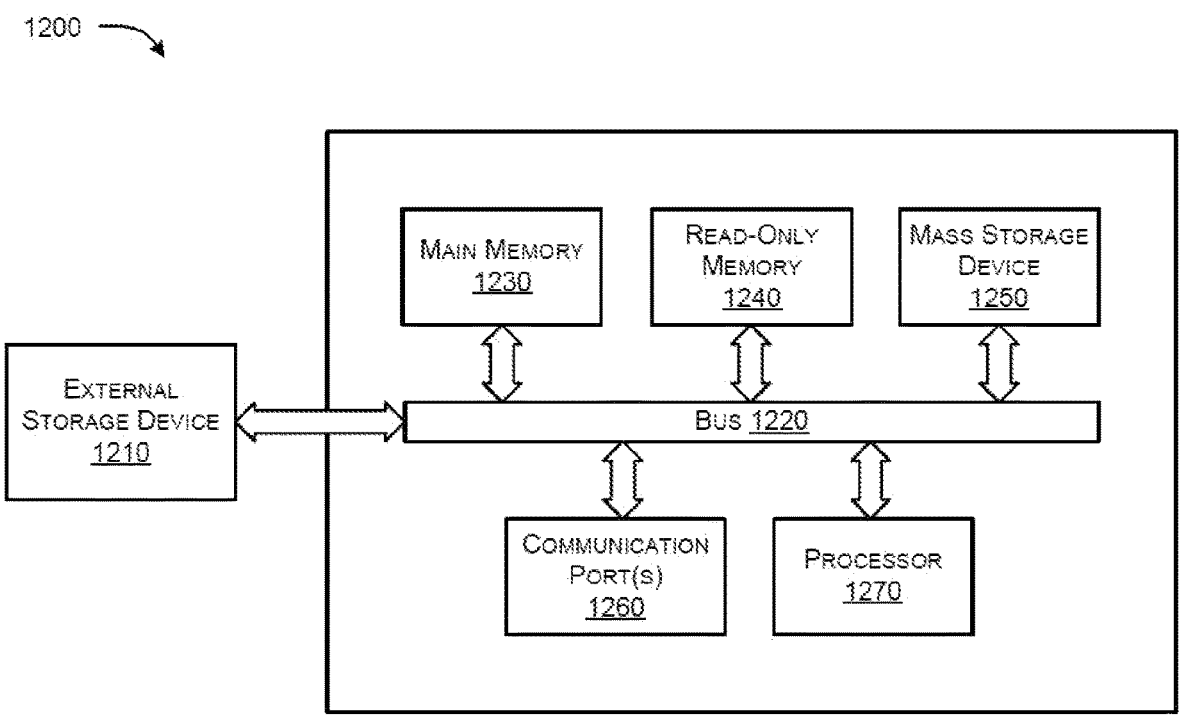

FIG. 12 illustrates an exemplary computer system (1200) in which or with which embodiments of the present disclosure may be implemented.

The foregoing shall be more apparent from the following more detailed description of the disclosure.

DEATILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an", and "the" are intended to include the plural forms as well, unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The various embodiments throughout the disclosure will be explained in more detail with reference to FIGS. 1-12.

Figure 1:
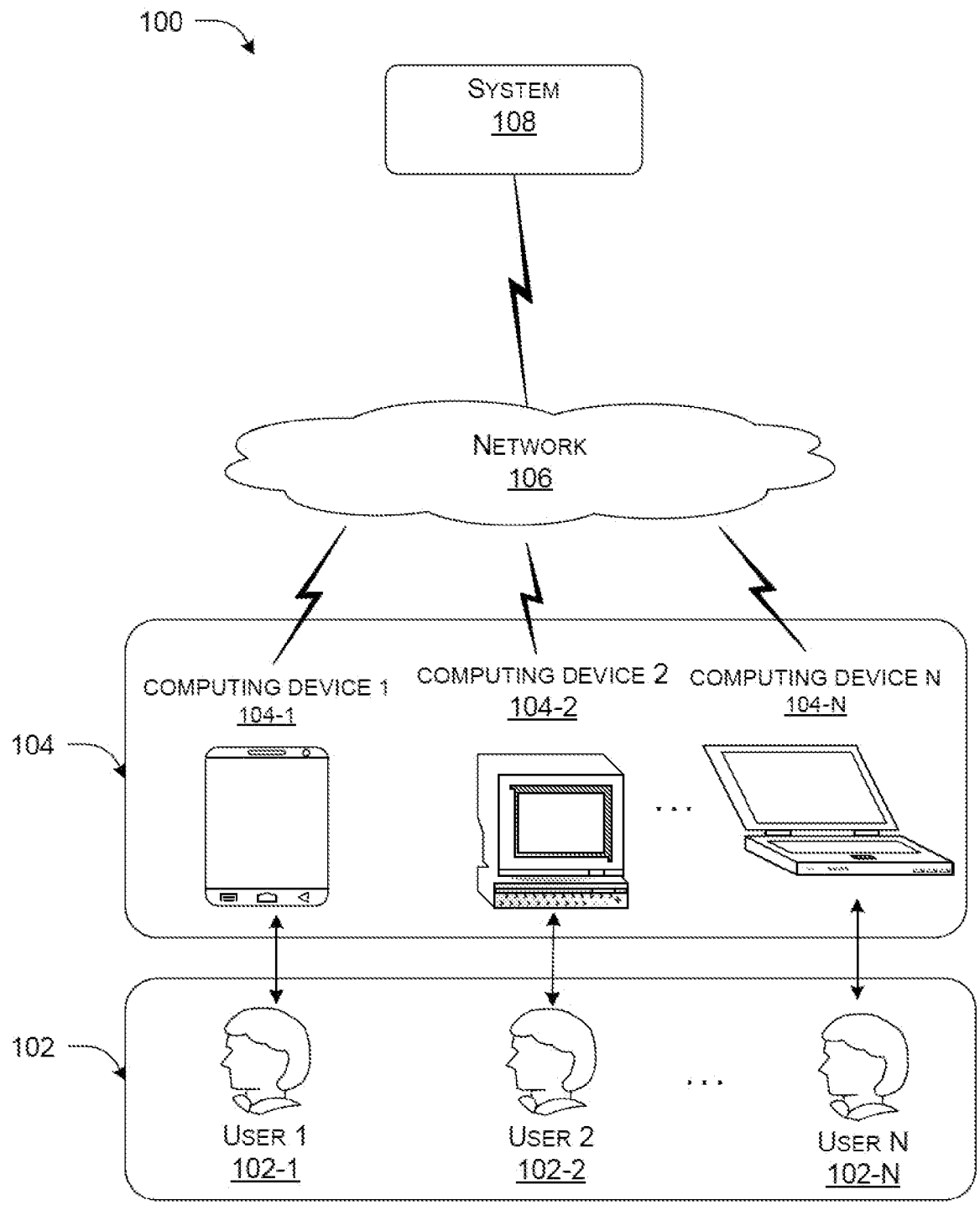
FIG. 1 illustrates an exemplary network architecture (100) for implementing a proposed system (108), in accordance with an embodiment of the present disclosure.

FIG. 1 illustrates an exemplary network architecture (100) of a proposed system (108), in accordance with an embodiment of the present disclosure.

As illustrated in FIG. 1, the network architecture (100) may include a system (108). The system (108) may be connected to one or more computing devices (104-1, 104-2 . . . 104-N) via a network (106). The one or more computing devices (104-1, 104-2 . . . 104-N) may be interchangeably specified as a user equipment (UE) (104) and be operated by one or more users (102-1, 102-2 . . . 102-N). Further, the one or more users (102-1, 102-2 . . . 102-N) may be interchangeably referred as a user (102) or users (102). The system (108) may be include or be associated with an offload entity, in accordance with embodiments of the present disclosure.

In an embodiment, the computing devices (104) may include, but not be limited to, a mobile, a laptop, etc. Further, the computing devices (104) may include a smartphone, virtual reality (VR) devices, augmented reality (AR) devices, a general-purpose computer, desktop, personal digital assistant, tablet computer, and a mainframe computer. Additionally, input devices for receiving input from the user (102) such as a touch pad, touch-enabled screen, electronic pen, and the like may be used. A person of ordinary skill in the art will appreciate that the computing devices (104) may not be restricted to the mentioned devices and various other devices may be used.

In an embodiment, the network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network (106) may also include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

In an embodiment, an offload entity included in the system (108) may receive a user request from the one or more users (102). The user request may be based on a content under viewership by the one or more users (102) via the computing device (104). The offload entity may identify the one or more users (102) accessing a similar media content based on the content under viewership. The offload entity may receive one or more parameters from the one or more users (102) based on the similar media content. The one or more parameters may include, but not limited to, a direction of mobility and a radio capability of the one or more users (102).

In an embodiment, the offload entity may determine a viewing time stamp and a buffer time for each of the one or more users (102). The viewing time stamp may be based on the identification of the one or more users (102) accessing the similar media content at the same viewing time stamp or different viewing time stamp. The offload entity may determine the buffer time based on a latest downloaded segment by the one or more users (102).

In an embodiment, the offload entity may determine a sliding window based on a user tolerance for a disruption in a viewing point for offloading the one or more users (102) based on the one or more parameters, the viewing time stamp, and the buffer time.

In an embodiment, the offload entity may intelligently offload at least a user among the one or more users (102) from a unicast network system to a broadcast or a multicast network system based on the sliding window. Further, the system (108) may intelligently onload at least a user among the one or more users (102) from the broadcast or the multicast network system to the unicast network system based on the sliding window.

In an embodiment, the system (108) may periodically receive the viewing time stamp from the computing device (104) and generate a buffer status report (BSR) based on the buffer time stamp and the viewing time stamp. The system (108) may determine the viewing time stamp based on a configuration message received from the computing device (104) within a predetermined period.

Although FIG. 1 shows exemplary components of the network architecture (100), in other embodiments, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

Figure 2:
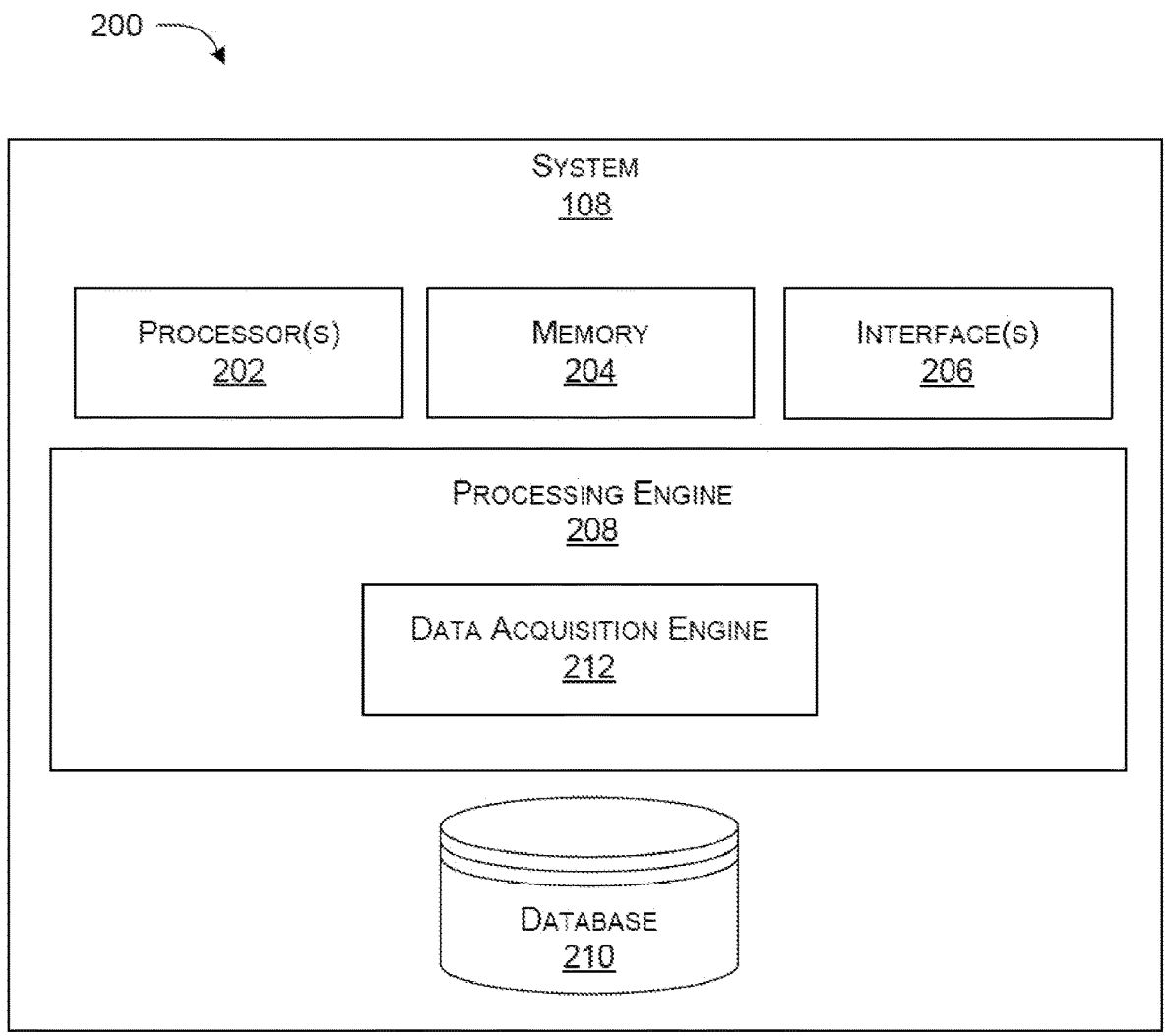
FIG. 2 illustrates an exemplary block diagram (200) of a proposed system (108), in accordance with an embodiment of the present disclosure.

FIG. 2 illustrates an exemplary block diagram (200) of a proposed system (108), in accordance with an embodiment of the present disclosure.

Referring to FIG. 2, the system (108) may comprise one or more processor(s) (202) that may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (108). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as random-access memory (RAM), or non-volatile memory such as erasable programmable read only memory (EPROM), flash memory, and the like.

In an embodiment, the system (108) may include an interface(s) (206). The interface(s) (206) may comprise a variety of interfaces, for example, interfaces for data input and output (I/O) devices, storage devices, and the like. The interface(s) (206) may also provide a communication pathway for one or more components of the system (110). Examples of such components include, but are not limited to, processing engine(s) (208) and a database (210), where the processing engine(s) (208) may include, but not be limited to, a data acquisition engine (212).

In an embodiment, the processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (108) may comprise the machine-readable storage medium storing the instructions and the processing resource to execute the instructions, or the machine-readable storage medium may be separate but accessible to the system (108) and the processing resource. In other examples, the processing engine(s) (208) may be implemented by electronic circuitry.

In an embodiment, the processor (202), associated with an offload entity, may receive a user request from one or more users (102) via the data acquisition engine (212). The processor (202) may store the user request in the database (210). The user request may be based on content under viewership by the one or more users (102) via a computing device (104). The processor (202) may determine an opportunity of offload the one or more users. The processor (202) may identify the one or more users (102) accessing a similar media content based on the content under viewership. The processor (202) may receive one or more parameters from the one or more users (102) based on the similar media content. The one or more parameters may include, but not limited to, a direction of mobility and a radio capability of the one or more users (102).

In an embodiment, the processor (202) may determine a viewing time stamp and a buffer time for each of the one or more users (102). The viewing time stamp may be based on the identification of the one or more users (102) accessing the similar media content at the same viewing time stamp or different viewing time stamp. The processor (202) may determine the buffer time based on a latest downloaded segment by the one or more users (102).

In an embodiment, the processor (202) may determine a sliding window based on a user tolerance for a disruption in a viewing point for offloading the one or more users (102) based on the one or more parameters, viewing time stamp, and the buffer time.

In an embodiment, the processor (202) may intelligently offload at least a user among the one or more users (102) from a unicast network system to a broadcast or a multicast network system based on the sliding window. Further, the processor (202) may intelligently onload at least a user among the one or more users (102) from the broadcast or the multicast network system to the unicast network system based on the sliding window.

In an embodiment, the processor (202) may periodically receive the viewing time from the computing device (104) and generate a BSR based on the buffer time and the viewing time. The processor (202) may determine the viewing time based on a configuration message sent by the computing device (104) within a predetermined period.

Although FIG. 2 shows exemplary components of the system (108), in other embodiments, the system (108) may include fewer components, different components, differently arranged components, or additional functional components than depicted in FIG. 2. Additionally, or alternatively, one or more components of the system (108) may perform functions described as being performed by one or more other components of the system (108).

Figure 3:
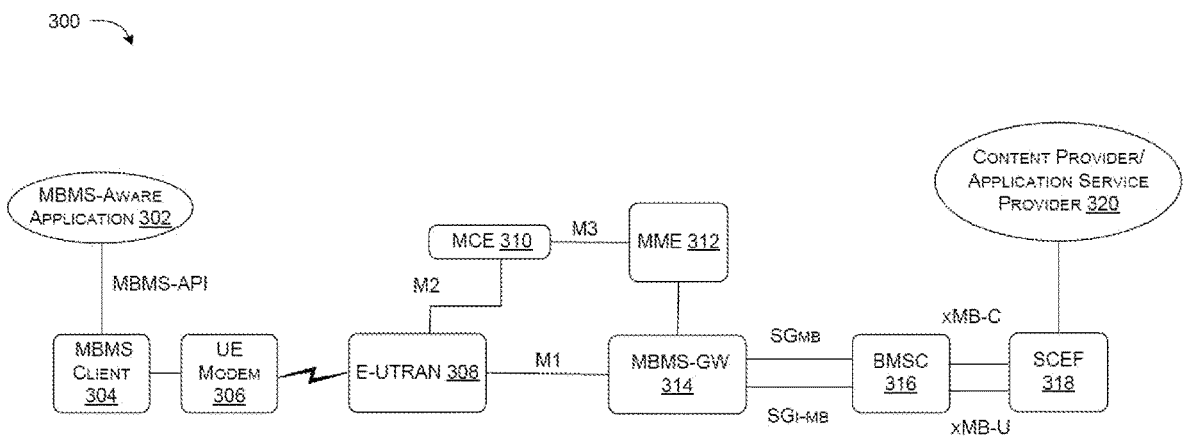
FIG. 3 illustrates an exemplary an end-to-end evolved multimedia broadcast and multicast services (eMBMS) architecture (300) for a fourth generation (4G) network, in accordance with an embodiment of the present disclosure.

FIG. 3 illustrates an exemplary an end-to-end evolved multimedia broadcast and multicast services (eMBMS) architecture (300) for a fourth generation (4G) network, in accordance with an embodiment of the present disclosure.

As illustrated in FIG. 3, in an embodiment, a UE modem (306) may access a content provider (320) via a MBMS-aware application (302) configured in a MBMS client (304). The content provider (320) may communicate with a broadcast multicast service center (BMSC) (316) via a service capabilities exposure function (SCEF) (318) and interfaces (XMB-C, XMB-U). The BMSC (316) may further access a multimedia broadcast multicast services-gateway (MBMS-GW) (314) via the SGmb and a SGI-MB. Further, the MBMS-GW (314) may be connected to various base stations in an evolved universal terrestrial radio access network (E-UTRAN) (308), a multi-cell/multicast co-ordination entity (MCE) (310), and a mobility management entity (MME) (312). The UE modem (306) may be connected to the E-UTRAN (308). Further, the E-UTRAN (308) may be connected to the MME (312) via the interfaces (M2, M3) and the MCE (310), and to the MBMS-GW (314) via the interface M1. The MBMS-GW (314) may be connected to the MME (312) via the interface Sm. The UE modem (306) may be connected to the MBMS-aware application (302) via MBMS client (304).

Figure 4:
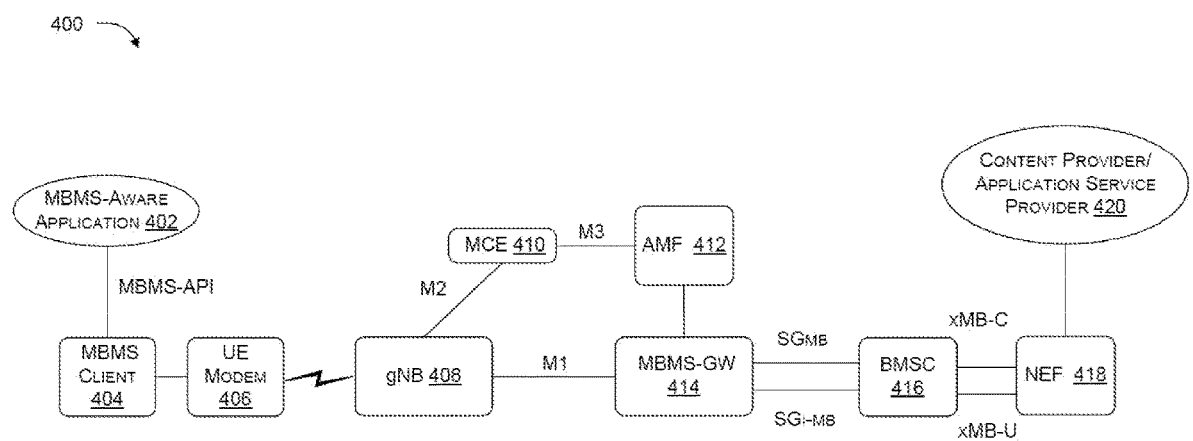
FIG. 4 illustrates an exemplary an end-to-end MBMS architecture (400) for a fifth generation (5G) network, in accordance with an embodiment of the present disclosure.

FIG. 4 illustrates an exemplary an end-to-end MBMS architecture (400) for a fifth generation (5G) network, in accordance with an embodiment of the present disclosure. A person skilled in the art may understand that the various modules mentioned in FIG. 4 may be similar to the corresponding modules of FIG. 3 in their functionality and may not be described again for the sake of brevity.

As illustrated in FIG. 4, in an embodiment, the end-to-end MBMS architecture for a 5G network may intelligently and seamlessly offload certain users (e.g., 102) from one broadcast/multicast system to another with many advantages. As illustrated in FIG. 4, the various modules may be similar to the modules described in FIG. 3, and may be implemented as a part of the 5G network for offloading certain users (102) from one broadcast/multicast system to another.

In an embodiment, a base station (408) may be connected to an access and mobility management function (AMF) (412) via the interfaces (M2, M3) and the MCE (410). Further, the base station (408) may be connected to the MBMS-GW (414). The MBMS-GW (414) may be connected to the AMF (412) via the interface Sm.

Figure 5:
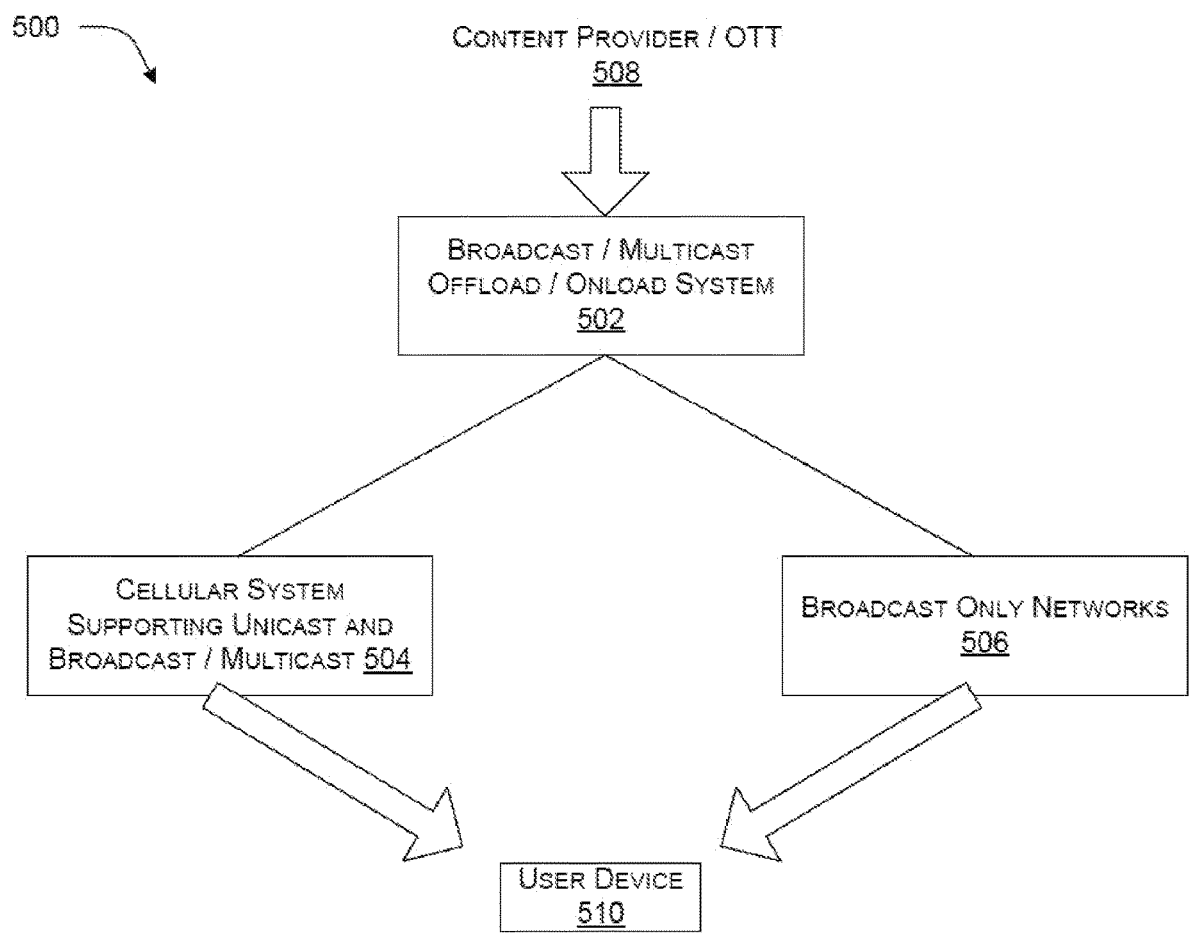
FIG. 5 illustrates an exemplary media stream delivery (500) from a content provider to an end user via a broadcast/ multicast offload/onload management entity, in accordance with an embodiment of the present disclosure.

FIG. 5 illustrates an exemplary media stream delivery (500) from a content provider to an end user via a Broadcast/Multicast offload/onload management entity, in accordance with an embodiment of the present disclosure.

As illustrated in FIG. 5, a broadcast/multicast offload/onload system (502) may collect necessary data for offloading/onloading certain users (e.g., 102). The broadcast/multicast offload/onload system (502) may collect certain data from a content provider/over-the-top (OTT) platform (508) and deliver to a user device (510). In an embodiment, the broadcast/multicast offload/onload system (502) may broadcast to a cellular system supporting unicast and broadcast/multicast (504) and a broadcast only network (506).

In another embodiment, the broadcast/multicast offload/onload system (502) may further include an intelligent entity that may decide if a user may be transitioned from a unicast session to a broadcast/multicast session without a session disruption. The intelligent entity may be resident in the multicast/broadcast offload system (502) or in a cellular system and may address the issue of user switching between unicast to broadcast/multicast either in the same radio access technology (RAT) or in a different broadcast RAT. It may be noted that the intelligent entity may be interchangeably referred to as an offload/onload entity or an offload entity.

FIG. 6 illustrates an exemplary offload/onload management (600) with a service continuity module, in accordance with an embodiment of the present disclosure.

As illustrated in FIG. 6, a UE (602) may send a user request to a broadcast/multicast offload system (612) via a non-third generation partnership project (non-3GPP) broadcast network (604), a 3GPP broadcast/multicast network (606), and a 3GPP unicast network (608). An intelligent entity (610) may be included in the broadcast/multicast offload system (612) that may process the user request and send the processed request to a content provider (614).

In an embodiment, the intelligent entity (610) may be a software entity residing in an offload platform that takes decision if a media content may be offloaded to another dedicated broadcast/multicast system or move back (onload) to a cellular network (to a unicast data transfer or a broadcast session).

FIG. 7 illustrates an exemplary offload management (700) with an intelligent entity, in accordance with an embodiment of the present disclosure.

As illustrated in FIG. 7, a UE (702) may send a user request to a broadcast/multicast offload system (712) via a non-3GPP broadcast network (704), a 3GPP broadcast/multicast network (706), and a 3GPP unicast network (708).

An intelligent entity (710) may be included in the non-3GPP broadcast network (704), the 3GPP broadcast/multicast network (706), or the 3GPP unicast network (708) itself. The intelligent entity (710) may take a decision on whether a media content shall be offloaded to another dedicated broadcast/multicast system or move back to a cellular network.

FIG. 8 illustrates an exemplary diagram (800) representing a sliding window, in accordance with an embodiment of the present disclosure.

As illustrated in FIG. 8, in an embodiment, the system (108) may determine a sliding window where all the users (102) coming under this window may be selected for the offload. As shown in FIG. 8, a window of period in which all the three users (User-1 (802), User-2 (804), User-3 (806)) may be moved such that they may start downloading data packets from the end of the window. User-1 (802) and User-2 (804) may receive duplicate packets for some time till their respective buffered time (Bt) ends but User-3 (806) may continue to receive the packets from the end of Bt via broadcast/multicast technology to which the system has offloaded the user. Thus, with this mechanism, many such users falling under the user selector sliding window may be offloaded successfully and thereby save bandwidth which otherwise would have got consumed to transmit the data over unicast. Thus, the system (108) may select an End of the Window (EoW) in such a way that a maximum number of users (102) are covered within the buffered window and at the same time no user loses any segments as well.

In an embodiment, the system (108) may calculate the buffered time (Bt) at which a last buffered segment may be received by the user/UE successfully. Bt may be represented as a Serial Number (SN) of segments received without units of time.

In an embodiment, the system (108) may calculate a view/viewing time (Vt) at which the user/UE may be watching a media content. Vt may also be represented as a Serial Number (SN).Hence, a platform/algorithm running in the system (108), i.e. broadcast/multicast onload/offload system may need to know the Bt, Vt per user/UE periodically to call on offloading.

In an embodiment, Bt may be obtained by the system (108) asking an application server/content delivery network (CDN) to share the last successfully acknowledged downloaded segment by a given user/UE.

In an embodiment, the system (108) may request the user/UE (via middleware) to share the same using a BSR message, where Vt may be obtained by the system (108) from the UE periodically or an on-demand basis. The BSR message may be used for the same or a new message may be used. A similar process may be used for other protocol messages shared by the middleware to the system (108).

In an embodiment, a periodic timer may be set by the system (108) and communicated to the middleware residing in the UE over a configuration message. A Vt_Timer or a periodic timer may be configured by the system (108) over the configuration message to the UE (middleware). Further, a BSR_Request message from the system (108) may be sent on-demand basis requesting UE (middleware) to share the BSR message.

In an embodiment, the Buffer_Status_Report::{Bt: MPD_Segment_SN,Vt: MPD_Segment_SN with the BSR_Request::{Bt:Boolean:{TRUE, FALSE} Vt: Boolean: {TRUE, FALSE}} may sent by the UE where Bt:Boolean-TRUE may indicate Bt to be reported back whereas Vt: Boolean-TRUE may indicate Vt to be reported back with a configuration message in the format Config_Msg::{Vt_Timer:{0123456789 ms}}.

FIG. 9 illustrates an exemplary flow diagram (900) for generating a BSR with a periodic configuration, in accordance with an embodiment of the present disclosure.

As illustrated in FIG. 9, the following steps may be implemented by the system (108).

At step 912: The UE (902) may be registered.

At step 914: Data collection from the 5GS (radio access network (RAN)/core network (CN)) may be done via network data analytics function (NDAF)/network exposure function (NEF) across the 5G system (5GS) (904) and the proposed system (108) including an offload/onload management (906) and an intelligent data collector (908), and a content provider (CP) (910).

At step 916: A configuration message may be sent by the intelligent data collector (908) to the UE (902).

At step 918: A BSR may be sent by the UE (902) to the intelligent data collector (908).

At step 920: Another BSR may be sent by the UE (902) to the intelligent data collector (908).

At step 922: A trigger mechanism for offload/onload management may be established across the UE (902), the 5GS (904), the offload/onload management (906), the intelligent data collector (908), and the CP (910).

FIG. 10 illustrates an exemplary flow diagram (1000) for generating a BSR with an on-demand basis configuration, in accordance with an embodiment of the present disclosure.

As illustrated in FIG. 10, the following steps may be implemented by the system (108).

At step 1012: The UE (1002) may be registered.

At step 1014: Data collection from the 5GS (RAN/CN) may be done via NDAF/NEF across the 5GS (1004), the system 108 including offload/onload management (1006) and an intelligent data collector (1008), and the CP (1010).

At step 1016: A configuration message may be sent by the intelligent data collector (1008) to the UE (1002).

At step 1018: A BSR may be sent by the UE (1002) to the intelligent data collector (1008).

At step 1020: Another BSR may be sent by the UE (1102) to the intelligent data collector (1108).

At step 1022: A BSR request may be sent from the intelligent data collector (1008) to the UE (1002).

At step 1024: A BSR may be sent by the UE (1002) to the intelligent data collector (1008).

At step 1026: A trigger mechanism for offload/onload management may be established across the UE (1002), the 5GS (1004), the offload/onload management (1006), the intelligent data collector (1008), and the CP (1008).

FIG. 11 illustrates an exemplary advertisement insertion mechanism (1100) in the system (108), in accordance with an embodiment of the present disclosure.

In an embodiment, switching times for users (102) may be masked by the insertion of advertisements to synchronize other users who are behind by some time so that collectively a set of users are brought to a particular viewing time. A mechanism may be implemented where the set of users who are ahead in time may be synchronized using one or more advertisements for "periods" of time.

In an embodiment, an intelligence entity (1102) may determine which of the users are ahead and need to be targeted for advertisement insertions and for what periods of time. The intelligence entity (1102) may trigger an advertisement (Ad) insertion server in a typical Ad insertion mechanism as shown in FIG. 11 with "User identification (ID)" and the time periods for which the user needs to be targeted for advertisements.

The intelligence entity (1102) may trigger an Ad decision server to generate the one or more advertisements and send the one or more advertisements to a MPD generator (1104). Output from the MPD generator (1104) and a dynamic adaptive streaming over hypertext transfer protocol (HTTP) (DASH) segmentation packager with CDN origin (1106) with a head end (1112) may be accessed by a DASH client (1108). Further, the DASH client (1108) may process the inputs and send a final output to a media engine (1110).

FIG. 12 illustrates an exemplary computer system (1200) in which or with which embodiments of the present disclosure may be implemented.

As shown in FIG. 12, the computer system (1200) may include an external storage device (1210), a bus (1220), a main memory (1230), a read-only memory (1240), a mass storage device (1250), a communication port(s) (1260), and a processor (1270). A person skilled in the art will appreciate that the computer system (1200) may include more than one processor and communication ports. The processor (1270) may include various modules associated with embodiments of the present disclosure. The communication port(s) (1260) may be any of an RS-232 port for use with a modem-based dialup connection, a 10/100 Ethernet port, a Gigabit or 10 Gigabit port using copper or fiber, a serial port, a parallel port, or other existing or future ports. The communication ports(s) (1260) may be chosen depending on a network, such as a Local Area Network (LAN), Wide Area Network (WAN), or any network to which the computer system (1200) connects.

In an embodiment, the main memory (1230) may be Random Access Memory (RAM), or any other dynamic storage device commonly known in the art. The read-only memory (1240) may be any static storage device(s) e.g., but not limited to, a Programmable Read Only Memory (PROM) chip for storing static information e.g., start-up or basic input/output system (BIOS) instructions for the processor (1270). The mass storage device (1250) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

In an embodiment, the bus (1220) may communicatively couple the processor(s) (1270) with the other memory, storage, and communication blocks. The bus (1220) may be, e.g. a Peripheral Component Interconnect PCI)/PCI Extended (PCI-X) bus, Small Computer System Interface (SCSI), (USB), or the like, for connecting expansion cards, drives, and other subsystems as well as other buses, such a front side bus (FSB), which connects the processor (1270) to the computer system (1200).

In another embodiment, operator and administrative interfaces, e.g., a display, keyboard, and cursor control device may also be coupled to the bus (1220) to support direct operator interaction with the computer system (1200). Other operator and administrative interfaces can be provided through network connections connected through the communication port(s) (1260). Components described above are meant only to exemplify various possibilities. In no way should the aforementioned exemplary computer system (1200) limit the scope of the present disclosure.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter is to be implemented merely as illustrative of the disclosure and not as a limitation.

Advantages of the Invention

The present disclosure provides a system and a method that intelligently offloads certain users from a unicast network to a broadcast network without a disruption of service.

The present disclosure provides a system and a method that identifies a user viewing point of content and using parameters such as buffer status decides on a switching decision from the unicast network to the broadcast network.

The present disclosure provides a system and a method that addresses an issue of user switching between the unicast to broadcast/multicast either in the same radio access technology (RAT) or in a different broadcast RAT.

The present disclosure provides a system and a method that intelligently and seamlessly offloads certain users from one broadcast/multicast system to another and thereby enables an efficient usage of licensed radio resources.

We claim:

1. A system for offloading consumers across one or more radio access technologies, the system comprising:
a processor; and
a memory operatively coupled with the processor, wherein said memory stores instructions which, when executed by the processor, cause the processor to:
receive a user request from one or more users, wherein the user request is based on a content under viewership by the one or more users via a computing device, and wherein the system comprises an offload entity associated with the processor and the memory which causes the offload entity to determine an opportunity to offload the one or more users by being configured to:
identify the one or more users accessing a similar media content based on the content under viewership;
receive one or more parameters from the one or more users based on the similar media content, wherein the one or more parameters comprise at least one of: a direction of mobility, and a radio capability of the one or more users;
determine a viewing timestamp and a buffer time for each of the one or more users, wherein the processor is to periodically receive the viewing timestamp from the computing device, and generate a buffer status report based on the buffer time and the viewing time stamp;
determine a sliding window based on a user tolerance for a disruption in a viewing point for offloading the one or more users based on the one or more parameters, the viewing time stamp, and the buffer time;
intelligently offload at least a user among the one or more users from a unicast network system to a broadcast or a multicast network system based on the sliding window; and
insert one or more advertisements for a preset time to synchronize the one or more users.

2. The system as claimed in claim 1, wherein the unicast network system comprises a cellular network system, and wherein the broadcast or the multicast network system comprises a non-cellular network system.

3. The system as claimed in claim 1, wherein the processor is to determine the viewing time stamp based on the identification of the one or more users accessing the similar media content at the same viewing time stamp or different viewing time stamp.

4. The system as claimed in claim 1, wherein the processor is to determine the buffer time based on a latest downloaded segment by the one or more users.

5. The system as claimed in claim 1, wherein the processor is to determine the viewing time stamp based on a configuration message received from the computing device within a predetermined period.

6. The system as claimed in claim 1, wherein the processor is to intelligently onload at least another user among the one or more users from the broadcast or the multicast network system to the unicast network system based on the sliding window.

7. A method for offloading consumers across one or more radio access technologies, the method comprising:
  receiving, by a processor associated with a system, a user request from one or more users, wherein the user request is based on a content under viewership by the one or more users via a computing device;
  determining, by an offload entity in the system and associated with the processor an opportunity to offload the one or more users by:
    identifying, by the processor, the one or more users accessing a similar media content based on the content under viewership;
    receiving, by the processor, one or more parameters from the one or more users based on the similar media content, wherein the one or more parameters comprise at least one of: a direction of mobility, and a radio capability of the one or more users;
    determining, by the processor, a viewing timestamp and a buffer time for each of the one or more users, wherein the processor is to periodically receive the viewing timestamp from the computing device, and generate a buffer status report based on the buffer time and the viewing time stamp;
    determining, by the processor, a sliding window based on a user tolerance for a disruption in a viewing point for offloading the one or more users based on the one or more parameters, the viewing time stamp, and the buffer time;
    intelligently offloading, by the processor, at least a user among the one or more users from a unicast network system to a broadcast or a multicast network system based on the sliding window; and
    inserting one or more advertisements for a preset time to synchronize the one or more users.

8. The method as claimed in claim 7, comprising determining, by the processor, the viewing time stamp based on the identification of the one or more users accessing the similar media content at the same viewing time stamp or different viewing time stamp.

9. The method as claimed in claim 7, comprising determining, by the processor, the buffer time based on a latest downloaded segment by the one or more users.

10. The method as claimed in claim 7, comprising determining, by the processor, the viewing time stamp based on a configuration message received from the computing device within a predetermined period.

11. The method as claimed in claim 7, comprising intelligently onloading, by the processor, at least another user among the one or more users from the broadcast or the multicast network system to the unicast network system based on the sliding window.

12. A user equipment (UE) for sending requests, the UE comprising:
  one or more processors communicatively coupled to a processor associated with a system, wherein the one or more processors are coupled with a memory, and wherein said memory stores instructions which, when executed by the one or more processors, cause the one or more processors to:
    transmit a request to the processor via a network, wherein the request is based on a content under viewership by one or more users via the UE,
    wherein the processor is associated with an offload entity in the system to determine an opportunity to offload the one or more users by being configured to:
    receive the request from the UE;
    identify the one or more users accessing a similar media content based on the content under viewership;
    receive one or more parameters from the one or more users based on the similar media content, wherein the one or more parameters comprise at least one of: a direction of mobility, and a radio capability of the one or more users;
    determine a viewing time stamp and a buffer time for each of the one or more users (102), wherein the processor is to periodically receive the viewing timestamp from the computing device, and generate a buffer status report based on the buffer time and the viewing time stamp;
    determine a sliding window based on a user tolerance for a disruption in a viewing point for offloading the one or more users based on the one or more parameters, the viewing time stamp, and the buffer time;
    intelligently offload at least a user among the one or more users from a unicast network system to a broadcast or a multicast network system based on the sliding window; and
    insert one or more advertisements for a preset time to synchronize the one or more users.

13. A non-transitory computer readable medium comprising a processor with executable instructions, causing the processor to:
  receive a user request from one or more users, wherein the user request is based on a content under viewership by the one or more users via a computing device;
  determine an opportunity to offload the one or more users by being configured to:
    identify the one or more users accessing a similar media content based on the content under viewership;
    receive one or more parameters from the one or more users based on the similar media content, wherein the one or more parameters comprise at least one of: a direction of mobility, and a radio capability of the one or more users;
    determine a viewing time stamp and a buffer time for each of the one or more users, wherein the processor is to periodically receive the viewing time stamp from the computing device, and generate a buffer status report based on the buffer time and the viewing time stamp;
    determine a sliding window based on a user tolerance for a disruption in a viewing point for offloading the one or more users based on the one or more parameters, the viewing time stamp, and the buffer time; and
    intelligently offload at least a user among the one or more users from a unicast network system to a broadcast or a multicast network system based on the sliding window; and insert one or more advertisements for a preset time to synchronize the one or more users.

\* \* \* \* \*